United States Patent [19]
Zagoruiko et al.

[11] 4,109,103
[45] Aug. 22, 1978

[54] SPEECH SIMULATOR

[76] Inventors: Nikolai Grigorievich Zagoruiko, Morskoi prospekt 21, kv. 28; Alexandr Borisovich Kolmogorov, ulitsa Zorge 237, kv. 36, both of Novosibirsk, U.S.S.R.

[21] Appl. No.: 676,897

[22] Filed: Apr. 14, 1976

[30] Foreign Application Priority Data

Apr. 15, 1975 [SU] U.S.S.R. .............................. 2126341

[51] Int. Cl.² .............................................. G10L 1/10
[52] U.S. Cl. .................................. 179/1 SG; 84/330; 179/1 AL
[58] Field of Search ............ 116/137 R; 272/14; 84/2, 6, 330; 46/183, 187; 35/35 A, 35 C, 8 A; 179/1 SC, 1 SA, 1 AL; 3/1.3

[56] References Cited
U.S. PATENT DOCUMENTS

| 883,290 | 3/1908 | Burgess | 84/2 X |
|---|---|---|---|
| 1,497,651 | 6/1924 | Benes | 46/187 |
| 1,883,724 | 10/1932 | Grubman | 46/187 |
| 1,901,433 | 3/1933 | Burchett | 35/35 C X |

Primary Examiner—Daniel M. Yasich
Attorney, Agent, or Firm—Lackenbach, Lilling & Siegel

[57] ABSTRACT

A speech simulator includes an air duct composed of interconnected pipes, a first pipe ending with a mouthpiece, while the second pipe being hermetically connected to a closed variable-size cavity. A main resonator is provided with a lid, and a sourdine is provided which is movable inside the mouthpiece. The mouthpiece is hermetically coupled to the main resonator which communicates with the atmosphere. The proposed speech simulator can simulate natural speech.

8 Claims, 5 Drawing Figures

SPEECH SIMULATOR

The present invention relates to means for spontaneously reproducing complex sounds and human speech without any preliminary analysis or recording on a carrier and, more particularly, to speech simulators based upon the natural (or flow-acoustical) principle of forming sounds of speech.

The speech simulator of the present invention can be used by persons who are unable to speak or have difficulties in speaking. It is also applicable in speech synthesizers for readout of information from a computer, in translating machines, telephone and telegraph communication, and music instruments.

The problem of speech synthesis has been gaining in importance lately due to the progress in cybernetics, communication and computers.

Speech synthesizers are expected to find extensive application in man-computer systems.

As a result, there is a growing need for a simple, reliable and cheap speech simulator capable of natural, high-fidelity reproduction of speech.

The present invention provides a partial solution to this problem.

Today, there are known devices for simulating speech sounds, that are based upon the flow-acoustical principle of sound propagation. Their sphere of application has been extremely limited.

The speech apparatus of the Bell Brothers was an attempt to simulate man's organs of speech. It had a sectional tongue, lips that were a wire frame covered with soft fabric, gypsum teeth, a lower jaw, and vocal cords.

Despite its close resemblance to man's organs of speech, the apparatus could only reproduce vowels and nasal sounds, and a limited number of sound combinations.

The same source lists the mechanical speaking device evolved by Riecsz, which also was an unsuccessful attempt to solve the problem of simulating natural speech.

There exists a great number of works in the field of electronic synthesis of speech. It has to be borne in mind, however, that the devices described in these works require a preliminary analysis of the spoken material or the recording of the speech on a carrier.

There is also known a "speaking machine" built by Kempelen, which is intended to simulate some speech sounds and syllables and is based on the flow-acoustical principle.

The latter device comprises an air duct which is a combination of interconnected pipes, the first pipe ending with a mouthpiece, whereas the second pipe is hermetically coupled to a closed, variable-size cavity. The device further includes a main resonator provided on one side with a lid and having a narrow opening on the other side. The lid separates the main resonator from the first pipe. Built into the main resonator are individual resonators which communicate through openings and valves both with the main resonator and the atmosphere.

Air is supplied through the narrow opening to the main resonator, after which, depending upon a specific speech sound to be reproduced, it is either directed through the individual resonators and with the aid of the valves into the atmosphere, or is sent to the first pipe and the mouthpiece, provided that the main resonator's lid is open, and then released into the atmosphere, if the mouthpiece is compressed or muffled by hand. As a result, separate sounds and syllables are reproduced.

The device under review is disadvantageous in that it lacks means to control parameters of the mouthpiece (a sourdine, for example), and in that it lacks an audio generator, whereby it is impossible to ensure high-fidelity reproduction of natural speech.

It is an object of the present invention to provide a speech simulator which can perform high-fidelity reproduction of natural speech without any preliminary analysis of spoken material for recording the speech on a carrier.

The foregoing object is attained by providing a speech simulator comprising an air duct which is a combination of interconnected pipes including a first pipe ending with a mouthpiece, whereas a second pipe is hermetically connected to a closed, variable-size cavity, and a main resonator having a lid, in which simulator provision is made, in accordance with the invention, for a sourdine which is movable inside the mouthpiece, said mouthpiece being hermetically connected to the main resonator which communicates with the atmosphere.

It is expedient that the first pipe of the air duct be provided with a flow control valve and that the sourdine should be sectional, its first section being a resonator with a narrow neck facing the flow control valve.

It is preferable that the second pipe of the air duct should contain an audio generator on one side and a valve on the other.

It is also expedient that the main resonator have an additional closed resonating cavity communicating with the main resonator through an opening closed by a valve, said valve and said opening of the additional closed resonating cavity making up a smaller resonator. It is expedient that the outer edge of the mouthpiece have a chamfer with a recess facing the opening of the additional closed resonating cavity.

It is advisable that the main resonator have at least one slot with a valve on the side of the lid.

It is also advisable that the lid of the main resonator have at least one valved opening.

It is desirable that a low-frequency modulator with a bypass channel and a valve in said bypass channel be installed in the portion of the air duct between its inlet and the mouthpiece, said low-frequency modulator being constructed as a freely vibrating plate cantilevered on a base and overlapping a nozzle arranged in the air duct, the bypass channel being a pipe hermetically connected to the air duct upstream and downstream of the nozzle.

It is expedient that the audio generator be provided with a bypass channel constructed as a pipe hermetically connected to the inlet of the air duct and the portion of said air duct downstream of the audio generator.

The present invention provides a simple solution to the problem of speech simulation. The proposed speech simulator is reliable in operation, possesses a broad range of working temperatures, is simple to manufacture and can be made of readily available materials.

The proposed speech simulator is further advantageous in that it is a model of man's organs of speech, which provides unambiguous acoustical interpretation of the way speech sounds are formed. The speech simulator of the present invention can be used for work on the theory of speech formation and recognition.

Other objects and advantages of the present invention will become more apparent from the following detailed description of preferred embodiments thereof taken in conjunction with the accompanying drawings, wherein.

Figure 1:
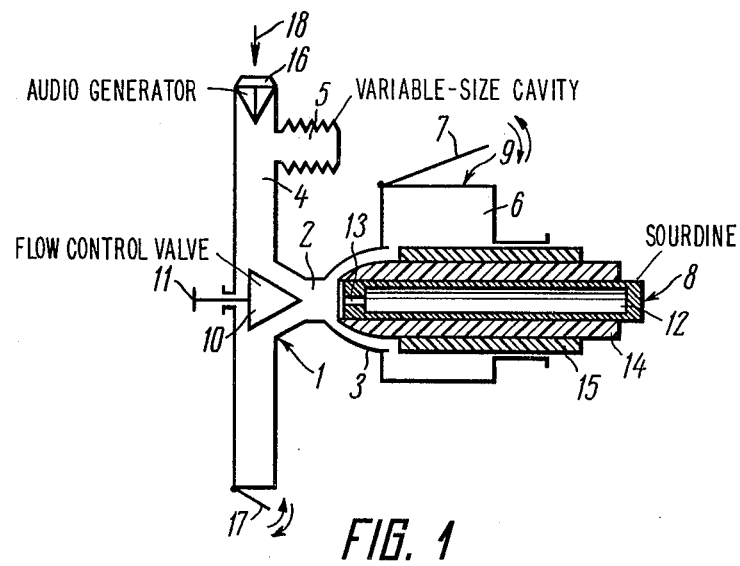
FIG. 1 is a view, partly diagrammatic and partly in cross-section, of an embodiment of a speech simulator in accordance with the invention.

Referring now to the attached drawings, the proposed speech simulator comprises an air duct 1 (FIG. 1) which is a combination of interconnected pipes. A first pipe 2 of the air duct 1 communicates with a mouthpiece 3. A second pipe 4 is hermetically connected to a closed, variable-size cavity 5. The speech simulator also includes a main resonator 6 provided with a lid 7 which is capable of moving as indicated by the arrows in FIGS. 1 and 2.

According to the invention, inside the mouthpiece 3 there is arranged a sourdine 8 which is movable in the mouthpiece. The mouthpiece 3 is hermetically connected to the main resonator 6 having an outlet through which said main resonator 6 communicates with the atmosphere.

According to the invention, the first pipe 2 of the air duct 1 contains a flow control valve 10 with a button 11. The sourdine 8 is sectional, its central section 12 being a resonator with a narrow neck 13 which faces the flow control valve 10.

Mounted on the central section 12 are sections 14 and 15.

Figure 2:
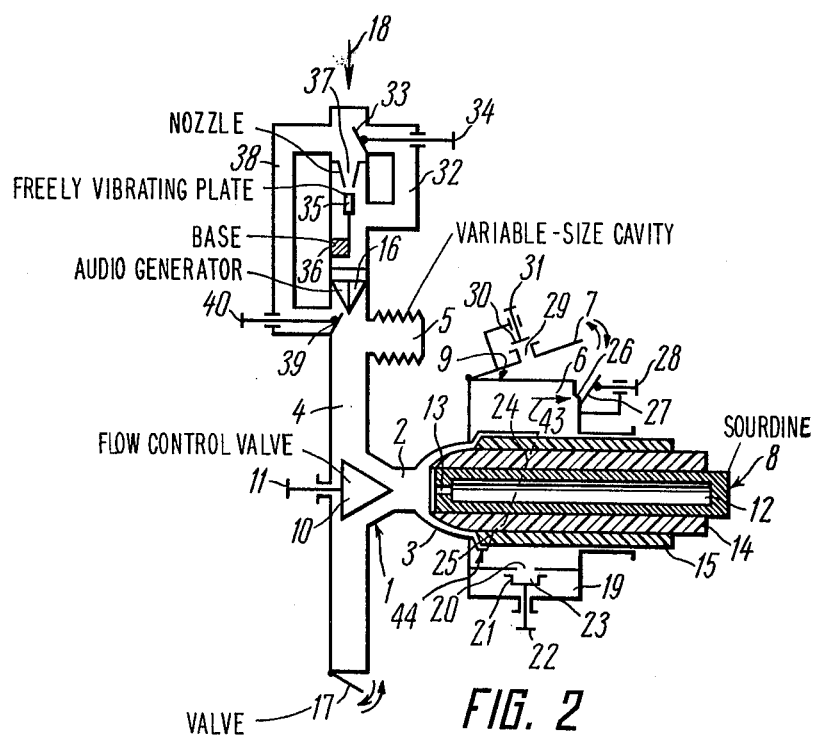
FIG. 2 is a view similar to FIG. 1 of an alternative embodiment of a speech simulator in accordance with the invention.

According to the invention, the second pipe 4 of the air duct 1 contains an audio generator 16 on one side and a valve 17 on the other which is capable of moving as indicated by the arrows in FIGS. 1 and 2. The arrow 18 indicates the direction in which air is sent to the air duct 1.

The main resonator 6 has an additional closed resonating cavity 19 (FIG. 2) which communicates with the main resonator 6 through an opening 20 closed by a valve 21 having a button 22.

The valve 21 and the opening 20 of the additional closed resonating cavity 19 make up a smaller resonator 23.

Figure 5:
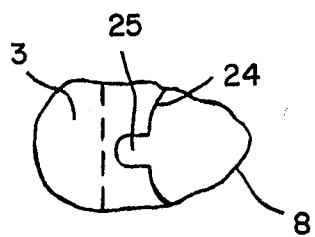
FIG. 5 shows a fragmented portion of the sourdine and mouthpiece with associated chamfer and recess as viewed in the direction of the arrow 44 in FIG. 2.

The mouthpiece 3 has a chamfer 24 with a recess 25 (FIG. 5) facing the opening 20 of the additional closed resonating cavity 19.

On the side of the lid 7, the edge of the main resonator 6 is provided with at least one slot 26 with a valve 27 (FIG. 6) having a button 28.

The lid 7 of the main resonator 6 has at least one opening 29 with a valve 30 having a button 31.

Arranged in the portion of the air duct 1 between its inlet and the outlet of the mouthpiece 3, is a low-frequency modulator with a bypass channel 32 wherein there is installed a valve 33 having a button 34.

The low-frequency modulator is constructed as a freely vibrating plate 35 cantilevered on a base 36 which is mounted on the wall of the air duct 1. The vibrating plate 35 overlaps a nozzle 37 installed in the air duct 1.

The bypass channel 32 is a pipe hermetically connected to the air duct 1 upstream and downstream of the nozzle 37.

The audio generator 16 is provided with a bypass channel 38 with a valve 39 having a button 40. The bypass channel 38 is a pipe hermetically connected to the inlet of the air duct 1 and the portion of said air duct 1 downstream of said audio generator 16.

The speech simulator of the present invention operates as follows.

Air is supplied to the air duct 1 (FIG. 2) in the direction indicated by the arrow 18. When simulating voiceless consonants (sounds like P, T, K, F, S, S*h*, H), air enters the bypass channel 38 and passes through the valve 39 which is opened with the aid of the button 40. Air then enters the second pipe 4, the closed cavity 5, the first pipe 2, the mouthpiece 3, and comes out through the main resonator 6 into the atmosphere.

In this case the valve 17 closes the second pipe 4. The sourdine 8 is drawn out of the mouthpiece 3, and the latter is open for free passage of the air flow.

When simulating the sound "K," the flow control valve 10 closes the inlet of the pipe 2 with the aid of the button 11. As this takes place, the closed cavity 5 is filled with air.

The valve 10 then opens the pipe 2, and the air flow runs into the edges of the narrow neck 13 of the central section 12 of the sourdine 8, whereby a noise corresponding to the "K" sound is produced.

When simulating the sound "H," the flow control valve 10 partially closes the inlet of the pipe 2, leaving a slot for the passage of air.

The air flow bypasses the poppet of the valve 10 so that it is compressed into a narrow jet which is sent against the edges of the narrow neck 13 of the central section 12 of the sourdine 8, whereby the desired noise effect is produced.

When simulating the "T" sound, the section 15 of the sourdine 8 is drawn into the mouthpiece 3 and seals the mouthpiece 3.

As a result, the closed cavity 5 is filled with air. The section 15 of the sourdine 8 is then drawn out, so that air can pass from the mouthpiece 3 through the main resonator into the atmosphere, whereby a noise is produced which corresponds to the "T" sound.

When simulating the sound "P," the main resonator 6 is closed by the lid 7 and the valves 27 and 30 controlled by the buttons 28 and 31, respectively.

The closed cavity 5 is filled with air, whereupon the lid 7 is opened, and the air is released from the main resonator 6 into the atmosphere, producing a noise which resembles the "P" sound.

When simulating the sound "SH," the section 15 of the sourdine 8 is drawn into the mouthpiece 3 and bars the passage of air from said mouthpiece 3. The recess 25 on the edge of the mouthpiece 3 remains open for passage of air, so that the air flow runs against the edges of the opening 20 of the additional closed resonating cavity 19. The result is a noise corresponding to the sound "SH."

When simulating the sound "S," the section 15 of the sourdine 8 is drawn into the mouthpiece 3 and thus prevents the air flow from leaving said mouthpiece 3. The recess 25 on the edge of the mouthpiece 3 remains open for passage of air. The valve 21, which is operated by the button 22, closes the opening 20, so that the smaller resonator 23 is formed. The air flow comes through the open recess 25 and against the edges of the opening 20, whereby a noise is produced which corresponds to the "S" sound.

When imitating the sound "F," the button 31 closes the opening in the lid 7. The latter, in turn, closes the main resonator. The slot 26 in the edge of the main resonator 6 remains open for passage of air. The result is a noise that resembles the sound "F."

When imitating the voiced consonants A, O, U, E, I, R, L, M, N, B, D, G, V, Z, ZH, Y, the bypass channel 38 is closed by the valve 39, by means of the button 40, and air is supplied through the bypass channel 32 to the audio generator 16, the second pipe 4, the closed cavity 5, the mouthpiece 3, and released through the main resonator 6 into the atmosphere. When imitating the voiced consonants B, D, G, V, Z, ZH, Y, the proposed speech simulator operates as in the case of the sounds P, T, K, F, S, SH, H, respectively.

The vowels O, U and E are imitated by varying the degree to which the lid 7 of the main resonator 6 is opened.

The vowel A is simulated by fully opening the lid 7 of the main resonator 6 and opening the valve 17 of the second pipe 4.

The vowel I is simulated with the aid of the section 14 of the sourdine 8, which section 14 moves inside the mouthpiece 3.

When simulating the M sound, the main resonator 6 is closed by the lid 7 and the valves 27 and 30 operated by the buttons 28 and 31, respectively. The valve 17 of the second pipe 4 is open.

When the sound N is simulated, the section 15 of the sourdine 8 is drawn into the mouthpiece 3 and thus prevents the air flow from leaving said mouthpiece 3. The valve 17 of the second pipe 4 is open.

When simulating the sound L, the main resonator 6 is closed by the lid 7 and the valve 27 operated by the button 28. The opening 29 in the lid 7 remains open, whereas the valve 17 of the second pipe 4 is closed. The result is an acoustical effect which resembles the L sound.

When imitating the sound R, the bypass channels 32 and 38 are closed by the valves 33 and 39, respectively, which valves 32 and 38 are controlled by the respective buttons 34 and 40. Air is directed to the nozzle 37 of the low-frequency modulator, and the plate 35 starts vibrating, interrupting the air flow emerging from the nozzle 37 at a frequency which is determined by the size of the plate 35. The result is an acoustical effect that resembles the R sound.

When simulating speech, the simulator's components are sequentially adjusted to reproduce the sounds of a phrase being pronounced, whereby natural speech patterns are ensured automatically.

Figure 3:
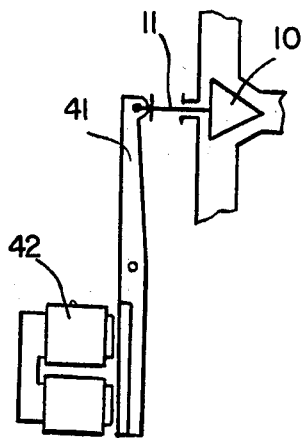
FIG. 3 is an illustrative arrangement using a solenoid which can be used to actuate the movable components of the speech simulator shown in FIGS. 1 and 2.
Figure 4:
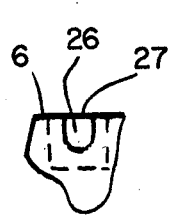
FIG. 4 shows a fragmented portion of the main resonator with associated slot and valve as viewed in the direction of the arrow 43 in FIG. 2.

The proposed simulator can be controlled both manually and by connecting the movable components of said simulator to different types of actuators. Many forms of different types of actuators are well known, and any suitable actuator may be used for this purpose. The specific actuator used is not a critical part of the present invention, as long as it achieves the function of moving the movable elements or components of the speech simulator as described above. Referring to FIG. 3, for example, there is shown an exemplary illustration of an arrangement for connecting the movable components of the simulator to actuators through a lever 41 controlling the position of the button 11. The button 11 is coupled by any suitable means to the flow control valve 10. The lever 41 cooperates with an electromagnet 42, which electromagnet may be connected to a computer or any other source of signals, whether programed or unprogramed, which is capable of actuating the electromagnet or solenoid 42. Using electromagnets for actuation of buttons or the like is well known to those skilled in the art and is described, for example, in a publication entitled "Electric Typewriter-Consul- 254," 1974, pages 9 and 20. This publication discloses a scheme of connection, in an electric typewriter, of electromagnets as part of a electro-mechanical system. A similar arrangement may be used to actuate the buttons in the speech simulator of the present invention by automatic means, including manual remote actuation and programed actuation.

The simulator of the present invention provides for natural, high-fidelity reproduction of arbitrarily composed phrases.

What is claimed is:
1. A speech simulator comprising:
interconnected first and second pipes;
a mouthpiece;
a sourdine which is movable within at least a portion of said mouthpiece;
a closed, variable-sized cavity,
said first pipe communicating with said mouthpiece,
said second pipe being hermetically connected to said closed, variable-size cavity;
a main resonator having an outlet communicating with the atmosphere, and a lid arranged to selectively open and close said outlet, said main resonator being hermetically connected to said mouthpiece and receiving said sourdine, said first and second pipes and said mouthpiece and said main resonator together forming an air duct; and air supply means for supplying air to said air duct successively along the following general path: said second pipe, said first pipe, said mouthpiece and said main resonator.

2. A speech simulator comprising:
interconnected first and second pipes;
a mouthpiece;
a sourdine which is movable within at least a portion of said mouthpiece;
a closed, variable-size cavity,
said first pipe communicating with said mouthpiece,
said second pipe being hermetically connected to said closed, variable-size cavity;
a main resonator having an outlet communicating with the atmosphere, and a lid arranged to selectively open and close said outlet, said main resonator being hermetically connected to said mouthpiece and receiving said sourdine, said first and second pipes and said mouthpiece and said main resonator together forming an air duct; and air supply means for supplying air to said air duct successively along the following general path; said second pipe, said first pipe, said mouthpiece and said main resonator; and
a flow control valve built into said first pipe of said air duct,
said sourdine having a central section in the nature of a resonator with a narrow neck facing said flow control valve.

3. A speech simulator comprising:
interconnected first and second pipes;
a mouthpiece;

a sourdine which is movable within at least a portion of said mouthpiece,
a closed, variable-size cavity,
said first pipe communicating with said mouthpiece,
said second pipe being hermetically connected to said closed, variable-size cavity;
a main resonator having an outlet communicating with the atmosphere, and a lid arranged to selectively open and close said outlet, said main resonator being hermetically connected to said mouthpiece and receiving said sourdine, said first and second pipes and said mouthpiece and said main resonator together forming an air duct; and air supply means for supplying air to said air duct successively along the following general path: said second pipe, said first pipe, said mouthpiece and said main resonator;
an audio generator arranged on one side in said second pipe of said air duct; and
a valve arranged on the opposite side in said second pipe of said air duct.

4. A speech simulator as claimed in claim 3, further comprising a bypass channel constructed as a pipe which is hermetically connected to said air duct and the portion of said air duct downstream of said audio generator.

5. A speech simulator comprising:
interconnected first and second pipes;
a mouthpiece;
a sourdine which is movable within at least a portion of said mouthpiece;
a closed variable-size cavity,
said first pipe communicating with said mouthpiece,
said second pipe being hermetically connected to said closed, variable-size cavity;
a main resonator having an outlet communicating with the atmosphere, and a lid arranged to selectively open and close said outlet, said main resonator being hermetically connected to said mouthpiece and receiving said sourdine, said first and second pipes and said mouthpiece and said main resonator together forming an air duct; and air supply means for supplying air to said air duct successively along the following general path: said second pipe, said first pipe, said mouthpiece and said main resonator;
an additional closed resonating cavity having an opening communicating with said main resonator; and
a valve which selectively closes said opening in said additional closed resonating cavity,
said valve and said opening in said additional closed resonating cavity making up a smaller resonator, and
said mouthpiece having an outer edge formed with a chamfer with a recess facing said opening in said additional closed resonating cavity.

6. A speech simulator comprising:
interconnected first and second pipes;
a mouthpiece;
a sourdine which is movable within at least a portion of said mouthpiece;
a closed, variable-size cavity,
said first pipe communicating with said mouthpiece,
said second pipe being hermetically connected to said closed, variable-size cavity;
a main resonator having an outlet communicating with the atmosphere, and a lid for selectively opening and closing said outlet, said main resonator being hermetically connected to said mouthpiece and receiving said sourdine, said first and second pipes and said mouthpiece and said main resonator together forming an air duct; and air supply means for supplying air to said air duct successively along the following general path: said second pipe, said first pipe, said mouthpiece and said main resonator;
said main resonator having an edge at said outlet provided with at least one slot, and a valve on the side of said lid arranged to open and close said slot.

7. A speech simulator comprising:
interconnected first and second pipes;
a mouthpiece;
a sourdine which is movable within at least a portion of said mouthpiece;
a closed, variable-size cavity,
said first pipe communicating with said mouthpiece,
said second pipe being hermetically connected to said closed, variable-size cavity;
a main resonator having an outlet communicating with the atmosphere, and a lid arranged to selectively open and close said outlet, said main resonator being hermetically connected to said mouthpiece and receiving said sourdine, said first and second pipes and said mouthpiece and said main resonator together forming an air duct; and air supply means for supplying air to said air duct successively along the following general path: said second pipe, said first pipe, said mouthpiece and said main resonator, and
said lid of said main resonator having at least one opening, and a valve for selectively opening and closing said opening.

8. A speech simulator comprising:
interconnected first and second pipes;
a mouthpiece;
a sourdine which is movable within at least a portion of said mouthpiece;
a closed, variable-size cavity,
said first pipe communicating with said mouthpiece,
said second pipe being hermetically connected to said closed, variable-size cavity;
a main resonator having an outlet communicating with the atmosphere, and a lid arranged to selectively open and close said outlet, said main resonator being hermetically connected to said mouthpiece and receiving said sourdine, said first and second pipes and said mouthpiece and said main resonator together forming an air duct; and air supply means for supplying air to said air duct successively along the following general path: said second pipe, said first pipe, said mouthpiece and said main resonator;
a nozzle within said second pipe;
a base downstream of said nozzle; and
a low-frequency modulator with a bypass channel, and a valve in said channel arranged in the portion of said air duct between its said inlet and said mouthpiece,
said low-frequency modulator being constructed as a freely vibrating plate cantilevered on said base and overlapping said nozzle, and
said bypass channel being a pipe hermetically connected to said air duct upstream and downstream of said nozzle.

* * * * *